March 3, 1964 G. C. WOLTERS 3,123,778

SIMULTANEOUS VARIATION OF OUTPUT AND INPUT CURRENTS
OF A TRANSISTOR AMPLIFIER BY MEANS
OF INPUT IMPEDANCE ADJUSTMENT

Filed Oct. 16, 1958

INVENTOR
GERARD CORNEILLE WOLTERS
BY
Frank R. Jifani
AGENT

United States Patent Office 3,123,778

Patented Mar. 3, 1964

3,123,778

SIMULTANEOUS VARIATION OF OUTPUT AND INPUT CURRENTS OF A TRANSISTOR AMPLIFIER BY MEANS OF INPUT IMPEDANCE ADJUSTMENT

Gerard Corneille Wolters, Eindhoven, Netherlands, assignor to North American Philips Company, Inc., New York, N.Y., a corporation of Delaware Filed Oct. 16, 1958, Ser. No. 767,645
Claims priority, application Netherlands Nov. 4, 1957
4 Claims. (Cl. 330—29)

This invention relates to a transistor amplifier in which provision is made for subdivision of the current flowing to two terminals of the amplifier. In known tube amplifiers provided with current subdivision, a control voltage applied to a grid interposed between two output electrodes controls the current which is passed by this grid so that in accordance with the grid voltage an adjustable part of the current reaches the two output electrodes.

It is a primary object of the present invention to achieve a similar effect in a transistor amplifier.

According to one aspect of the invention, a source of signals to be amplified is connected to the input electrodes of two transistors, the part of the current which flows from the signal source to one of these transistors being varied by controlling the input resistance of the other transistor.

The invention utilizes the fact, which is known per se, that the input resistance of a transistor can be adjusted in a simple manner, for example by variation of its current adjustment or by variation of its collector bias; this effect is not readily obtainable with tubes. The measure in accordance with the invention permits of simultaneously controlling by means of a manual control member, for example, both the volume and the negative feedback or both the volume and the signal level.

Figure 1:
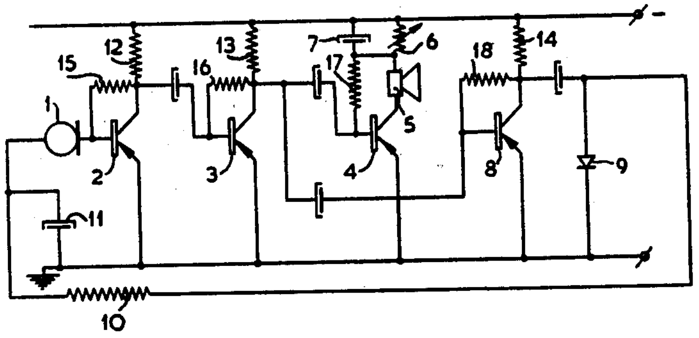
Figure 2:
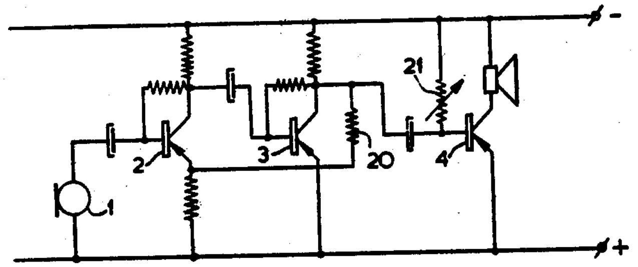

It order that the invention may readily be carried out, two embodiments thereof will now be described, by way of example, with reference to the accompanying drawings, in which:

FIG. 1 shows a low-frequency amplifier to be used, for example, in hearing aids, which is provided with means for the simultaneous variation of the volume and the signal level, and FIG. 2 shows an amplifier with simultaneous control of the volume and of the negative feedback.

The amplifier shown in FIG. 1 shows a source 1 of signals to be amplified, for example a microphone, which is connected to the input circuit of a transistor 2. The amplified output signal of this transistor 2 is amplified in a transistor 3 and then supplied to a transistor 4 the output circuit of which includes an output impedance 5, for example a telephone or a loudspeaker. A variable resistor 6, which is bridged by a capacitor 7 which passes the signal frequency, is connected in series with the output impedance 5 and, through a collector-base resistor 17, enables the base current and consequently the collector current of the transistor 4 to be adjusted in known manner. As is known, the input impedance of a transistor depends upon its current adjustment, i.e., it is about inversely proportional to the emitter forward current; therefore, by means of the variable resistor 6 the value of the input impedance of the transistor 4 can also be adjusted.

The output circuit of the transistor 3 is also connected to an auxiliary transistor 8. Thus, by controlling the input resistance of the transistor 4, an adjustable part of the signal current of the transistor 3 will flow to the input circuit of the transistor 8. The output signal of the transistor 8 is detected in known manner by means of a rectifier 9 and supplies a level-control current which is fed back through a resistor 10 to the input circuit of the transistor 2. A capacitor 11 acts to smooth the control current.

With increase in the signal level a larger signal is supplied both to the transistor 4 and to the transistor 8. Consequently the rectifier 9 provides a control current which adjusts the base of the transistor 2 further in the forward direction. By using a comparatively large collector resistor 12 in the collector circuit of the transistor 2 the collector bias of this transistor is reduced so that the signal amplification decreases in known manner. Thus a level control is obtained.

With constant signal strength an increase of the resistor 6 produces a decrease of the mean collector current of the transistor 4. Hence the input impedance of the transistor 4 is increased so that a larger part of the output signal current of the transistor 3 is applied to the transistor 8, since the output current of transistor 3 is subdivided between the inputs of transistors 4 and 8. Consequently the rectifier 9 again produces a stronger control current so that the signal level is reduced together with the gain control by means of the variable resistor 6.

By the choice of suitable values, so that the direct-voltage drops across the transistor 4 and across the output 5 are about equal, it can be ensured that regardless of the level of the microphone signal for every value of the resistor 6 the signal level at the output 5 remains just below the maximum permissible collector signal for the transistor 4.

In a practical embodiment transistors 2, 3 and 8 were of the type OC70 and transistor 4 of the type OC71. The values of the collector resistors 12, 13 and 14 were 2.2 KΩ, 2.2 KΩ and 1.5 KΩ, respectively. The value of each of the resistors 15, 16 and 18, which were included for stabilization of the operating point, was 39 KΩ. The resistor 6 was variable between 0 and 3 KΩ, the resistor 17 was 18 KΩ. The resistor 10 was 10 KΩ and the smoothing capacitor 11 was 10 μf.

In FIG. 2 a signal source 1 is again connected in the input circuit of an amplifier cascade comprising transistors 2, 3 and 4. The output circuit of the transistor 3 is also connected through a resistor 20 to the emitter of the transistor 2 so that through the latter negative feedback to the transistor 2 can be provided. By means of a variable resistor 21 the base-current adjustment of the transistor 4 and consequently the value of its input resistance can be controlled.

By increasing the value of the resistor 21, the base forward current of the transistor 4 is decreased and consequently its input resistance increased. As a result a smaller part of the output signal current of the transistor 3 will flow to the input circuit of the transistor 4 and hence a larger part of this signal current will be fed back in the negative sense to the emitter of the transistor 2. Thus by variation of the resistor 22 the signal gain of the transistor 4 and the negative feedback factor of the transistors 2 and 3 are controlled simultaneously.

While the invention has been described with respect to specific embodiments, various modification thereof will be readily apparent to those skilled in the art without departing from the inventive concept, the scope of which is set forth in the appended claims.

What is claimed is:

1. An amplifier circuit comprising first and second transistors each having emitter, base and collector electrodes forming an input electrode system and an output electrode system, a source of signals to be amplified, means coupling said source to the parallel combination of the input electrode systems of both transistors, first control means varying the emitter bias current of said second transistor thereby varying the input impedance of said second transistor, said input impedance variation operating to vary the amount of signal current flowing from said source to both of said transistors such that a decrease in the signal current to the second transistor due to an increase of its input impedance results in an increase in the signal current to the first transistor, and a feedback network coupled from the output electrode system of said first transistor to second control means in the source coupling path.

2. An amplifier circuit comprising first and second transistors each having emitter, base and collector electrodes forming an input electrode system and an output electrode system, a source of signals to be amplified, means coupling said source to the parallel combination of the input electrode systems of both transistors, first control means varying the emitter bias current of said second transistor thereby varying the input impedance of said second transistor, the output electrode system of said second transistor including the series arrangement of an output impedance and said first control means, the junction of said output impedance and said first control means being coupled to the base of the first transistor through a resistor, said input impedance variation operating to vary the amount of signal current flowing from said source to both of said transistors such that a decrease in the signal current to the second transistor due to an increase of its input impedance results in an increase in the signal current to the first transistor, and a feedback network coupled from the output electrode system of said first transistor to second control means in the source coupling path.

3. An amplifier circuit comprising first, second and third transistors each having emitter, base and collector electrodes forming input electrodes and output electrodes, a source of signals to be amplified, said source being coupled through the input and output electrodes of said third transistor to the parallel combination of the base electrodes of said first and second transistors, variable resistive control means coupled to the collector electrode of said second transistor for varying the emitter bias current of said second transistor thereby varying the input impedance of said second transistor, rectifier means connected to the output electrode of said first transistor for producing a direct gain-control current, a feedback network for applying said direct gain-control current to the input electrodes of said third transistor, said input impedance variation of said second transistor operating to vary the amount of signal current flowing from said third transistor to said first and second transistors thereby varying the amount of direct gain-control current applied to said third transistor, a decrease in the amount of signal current to the second transistor due to an increase of its input impedance resulting in an increase in the amount of signal current to the first transistor and an increase in the gain-control current.

4. An amplifier as claimed in claim 3, wherein the collector electrode of said second transistor is connected to the series arrangement of an output impedance and said variable resistive control means, the junction of said output impedance and said variable resistive control means being coupled to the base of the second transistor through a resistor, whereby a variation of said variable resistive control means simultaneously varies said direct gain-control current and the current through said output impedance.

References Cited in the file of this patent

UNITED STATES PATENTS

| | | |
|---|---|---|
| 2,691,075 | Schwartz | Oct. 5, 1954 |
| 2,762,874 | Barco | Sept. 11, 1956 |
| 2,794,076 | Shea | May 28, 1957 |
| 2,801,296 | Blecher | July 30, 1957 |
| 2,802,067 | Zawels | Aug. 6, 1957 |
| 2,813,934 | Cibelius | Nov. 19, 1957 |
| 2,835,748 | Ensink | May 20, 1958 |
| 2,863,957 | Hamilton | Dec. 9, 1958 |
| 2,878,380 | Holmes | Mar. 17, 1959 |

FOREIGN PATENTS

| | | |
|---|---|---|
| 1,121,329 | France | Aug. 8, 1956 |

OTHER REFERENCES

Herscher: "Designing Transistor A-F Power Amplifiers," Electronics, Engineering Edition, April 11, 1958, pages 96–99.